US006681179B1

(12) United States Patent
Chen (10) Patent No.: US 6,681,179 B1
(45) Date of Patent: Jan. 20, 2004

(54) METHOD FOR REMOTE ROUTES CALCULATION AND NAVIGATION WITH AUTOMATIC ROUTE DETECTION AND REVISION

(75) Inventor: Stephen Chen, Chang-Hua (TW)

(73) Assignee: E-Lead Electronic Co., Ltd., Chang-Hua (TW)

(*) Notice: Subject to any disclaimer, the term of this patent is extended or adjusted under 35 U.S.C. 154(b) by 51 days.

(21) Appl. No.: 10/075,229

(22) Filed: Feb. 15, 2002

(51) Int. Cl.[7] .................................................. G08G 1/09
(52) U.S. Cl. .................. 701/209; 340/988; 340/995.21; 340/995.25
(58) Field of Search ................................. 701/209, 205, 701/207, 210; 340/988, 989, 995.25, 995.21

(56) References Cited

U.S. PATENT DOCUMENTS

| | | | | |
|---|---|---|---|---|
| 5,359,529 A | * | 10/1994 | Snider | 701/210 |
| 5,541,845 A | * | 7/1996 | Klein | 701/207 |
| 6,124,810 A | * | 9/2000 | Segal et al. | 340/994 |
| 6,236,935 B1 | * | 5/2001 | Helmstadter et al. | 701/205 |
| 6,381,535 B1 | * | 4/2002 | Durocher et al. | 701/202 |
| 6,426,709 B1 | * | 7/2002 | Becker et al. | 340/992 |

FOREIGN PATENT DOCUMENTS

| | | | | |
|---|---|---|---|---|
| DE | 19639326 A1 | * | 3/1998 | G01C/21/00 |
| DE | 19755875 A1 | * | 6/1998 | G08G/01/01 |
| FR | 2761837 A1 | * | 10/1998 | G01C/21/00 |
| WO | WO 9813666 A1 | * | 4/1998 | G01C/21/20 |
| WO | WO 9826397 A1 | * | 6/1998 | G08G/01/127 |
| WO | WO 9845823 A1 | * | 10/1998 | G08G/01/127 |

* cited by examiner

Primary Examiner—Michael J. Zanelli
Assistant Examiner—Eric M Gibson
(74) Attorney, Agent, or Firm—Troxell Law Office PLLC (57) ABSTRACT

A method for remote routes calculation and navigation with automatic route detection and revision couples with navigation data transmission of a navigation center to increase navigation accuracy and greatly reduce data transmission between the navigation center and navigation required users. The method mainly includes calculating a linear deviation limit to serve as the maximum allowance limit to alert timely response for route deviations to enhance navigation accuracy.

6 Claims, 7 Drawing Sheets

METHOD FOR REMOTE ROUTES CALCULATION AND NAVIGATION WITH AUTOMATIC ROUTE DETECTION AND REVISION

BACKGROUND OF THE INVENTION

1. Field of the Invention

The invention relates to a method for remote routes calculation and navigation with automatic route detection and revision to reduce navigation data transmission in navigation centers and increase navigation accuracy for alerting timely response on route deviations to enhance navigation accuracy.

2. Description of the Prior Art

With continuous increasing of leisure time and growing ownership of cars, a lot of people like to drive long way to remote recreational locations to spend long week ends or vacations. However complicated road systems often create annoying problems for drivers who do not know the journeys and routes well. In order to help drivers to mitigate those troubles, many navigation systems have been developed and introduced. A lot of navigation systems now available on the market require users (people or cars) to carry a terminal which contains built-in electronic maps and navigation software for calculating routes, and a Global Positioning System (GPS) device to determine self location. Users have to locate in advance the destination on the electronic map, and through road data in the electronic map to calculate a driving route to display with the electronic map on the display device. Users may follow the route and drive to the destination. While such navigation function can achieve navigation purpose, there are still drawbacks to be overcome, notably:

1. Users have to spend a lot of money to buy computers, electronic maps and operating systems.
2. Setting destinations is quite difficult and time-consuming. People generally have difficulty to read maps on paper. To read electronic maps on computers in cars without input devices such as keyboards and mouse devices is even more difficult.
3. Road changes are difficult to update on electronic maps. Most electronic maps are stored in optical disks. Users have to buy new or updated versions frequently to get the correct and updated road conditions.
4. Route calculations some times could result in not sensible or not useful outcomes, and users generally are not allowed or not capable to fix the problems.

Because of aforesaid disadvantages, people could spend a lot of money on electronic navigation systems but do not get the conveniences desired. In order to resolve aforesaid disadvantages, applicant has proposed a technique that employs an information center to couple with navigation required equipment to provide an instant and convenient navigation system, and has submitted patent application (U.S. patent application Ser. No. 09/832,808). However, most navigation processing is done in the navigation center. In order to prevent route deviations during driving, when the navigation center transmits navigation routes, neighboring route data also are included and transmitted to the navigation required equipment. As a result, data transmission volume is greatly expanded. And service time for the navigation center and navigation required users also increase. Communication expenses soar and become a huge burden. There are some other non self-independent navigation information. References can be found in U.S. patent application Ser. No. 09/832,808 and WO9845823.

SUMMARY OF THE INVENTION

It is therefore the goal of the invention to provide a method for remote routes calculation and navigation with automatic route detection and revision. Through the invention, every navigation route transmission requires to transmit only one desired route. Reprocessing to address route deviations is performed only when deviations of the route between two fixed points is greater than a linear deviation limit. Thus data transmission can be reduced to effectively decrease service time for the navigation center, and navigation required users may save communication costs.

The primary object of the invention is to provide a method for remote routes calculation and navigation with automatic route detection and revision to effectively reduce navigation data transmission and increase navigation accuracy.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
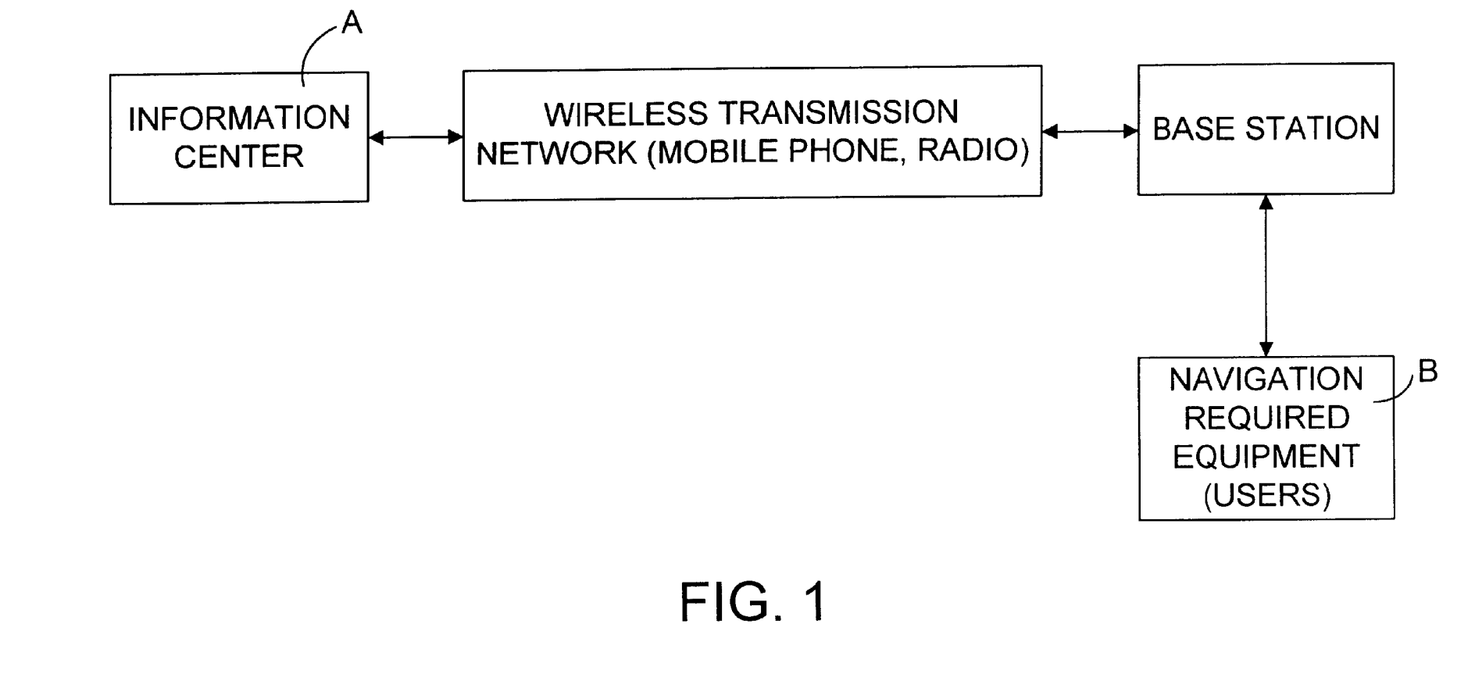
FIG. 1 is a block diagram of an embodiment of the invention.
Figure 2:
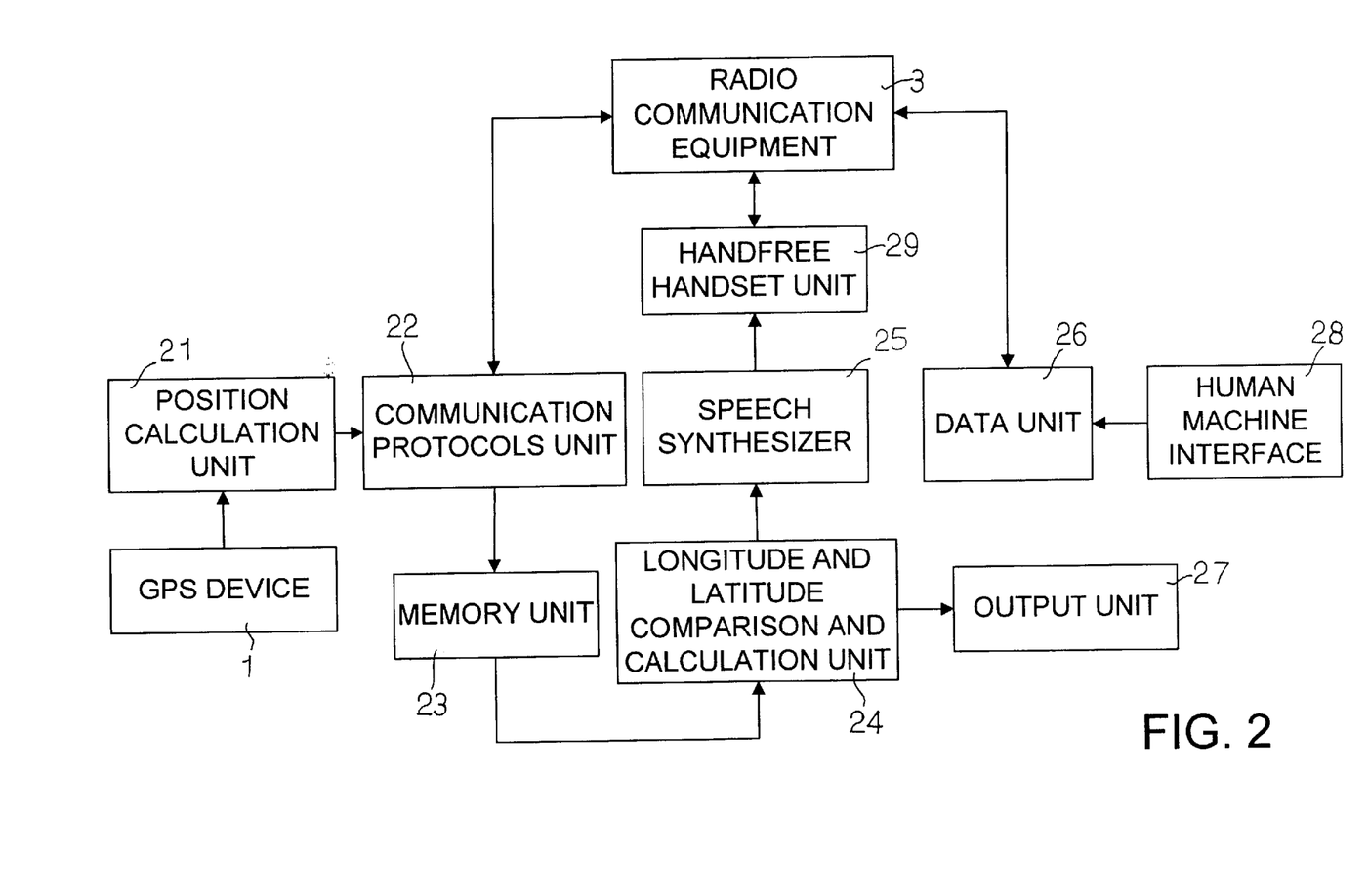
FIG. 2 is a system block diagram of the invention.

Referring to FIGS. 1 and 2, the remote routes calculation and navigation system of the invention mainly includes at least one information center A and navigation required equipment B, wherein:

the information center A includes at least one information processor which contains electronic maps and navigation software for calculating routes, and communication equipment for transmitting and receiving voice speech and data information;

the navigation required equipment B consists of a Global Positioning System (GPS) device 1 and a communication device 2. The GPS device 1 is for receiving satellite signals. The communication device 2 is for linking and communicating with the information center and provides duplex data transmission. The communication device 2 includes a human machine interface 28, an output unit 27, a data unit 26, a handfree handset unit 29, a speech synthesizer 25, a longitude and latitude comparison and calculation unit 24, a communication protocols unit 22, a memory unit 23, a position calculation unit 21 and a radio communication equipment 3.

The human machine interface 28 is an interface allowing users to enter input data and includes at least one intelligent button key to allow users to press and automatically link to the information center for transmitting and receiving information. It may be a keypad array, hand written input, touch screen, microphone, or the like.

The output unit 27 allows the system to output guiding tips and alert messages, and may be a screen, or a speaker.

The data unit 26 stores data including information center telephone numbers, data network address and information center liaison information.

The handfree handset unit 29 is coupled with the radio communication equipment to allow users to make conversation with the information center without holding the handset.

The speech synthesizer 25 stores tips for driving directions and road condition data to couple with data downloading from the information center, and through the output unit to deliver voice speech messages (such as turn to the left at the front intersection).

The longitude and latitude comparison and calculation unit 24 receives signals from GPS device 1 to couple with electronic maps downloading from the information center to indicate self location.

The communication protocols unit 22 stores protocols and codes (decodes) required in the invention such as radio communication equipment communication protocols, GPS signals coding protocols, data transmission protocols, etc.

The memory unit 23 stores display information downloading from the information center and input data etc.

The position calculation unit 21 receives signals from the GPS device 1 for rear end use.

The radio communication equipment 3 is a communication device to link the information center such as mobile phone, wireless electric devices.

Figure 3A:
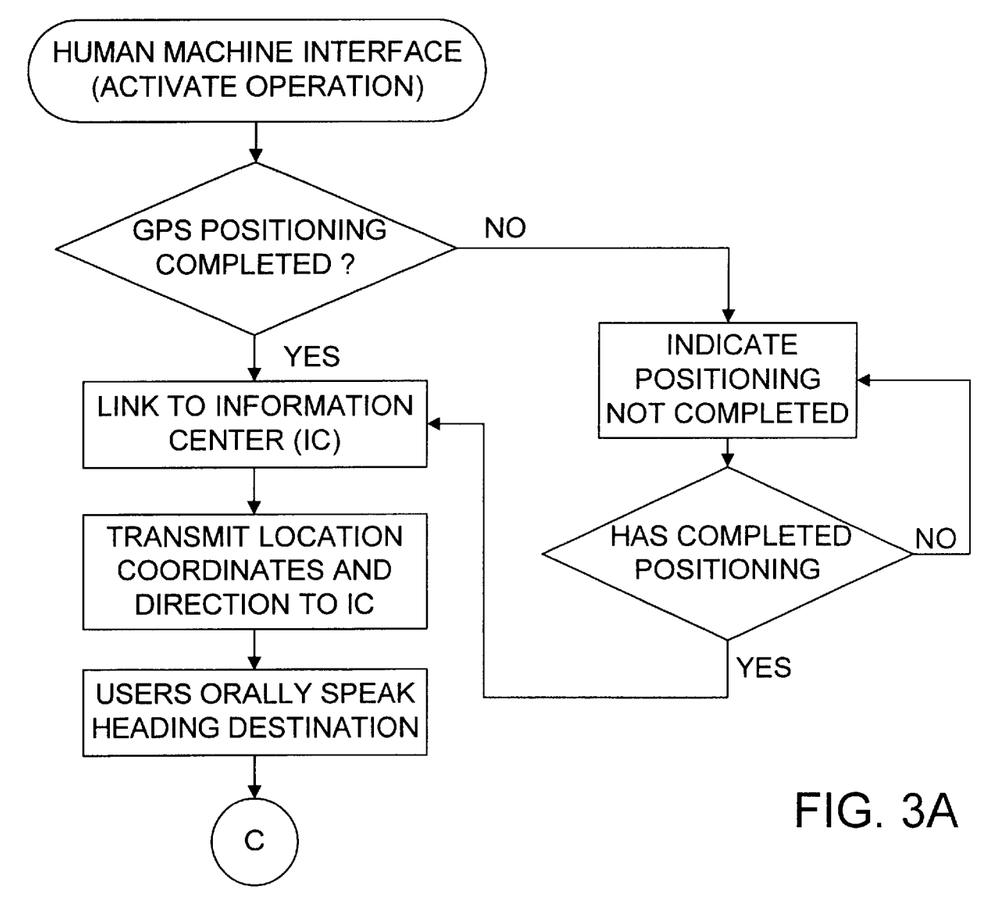
FIGS. 3A and 3B are process flow of the invention.
Figure 3B:
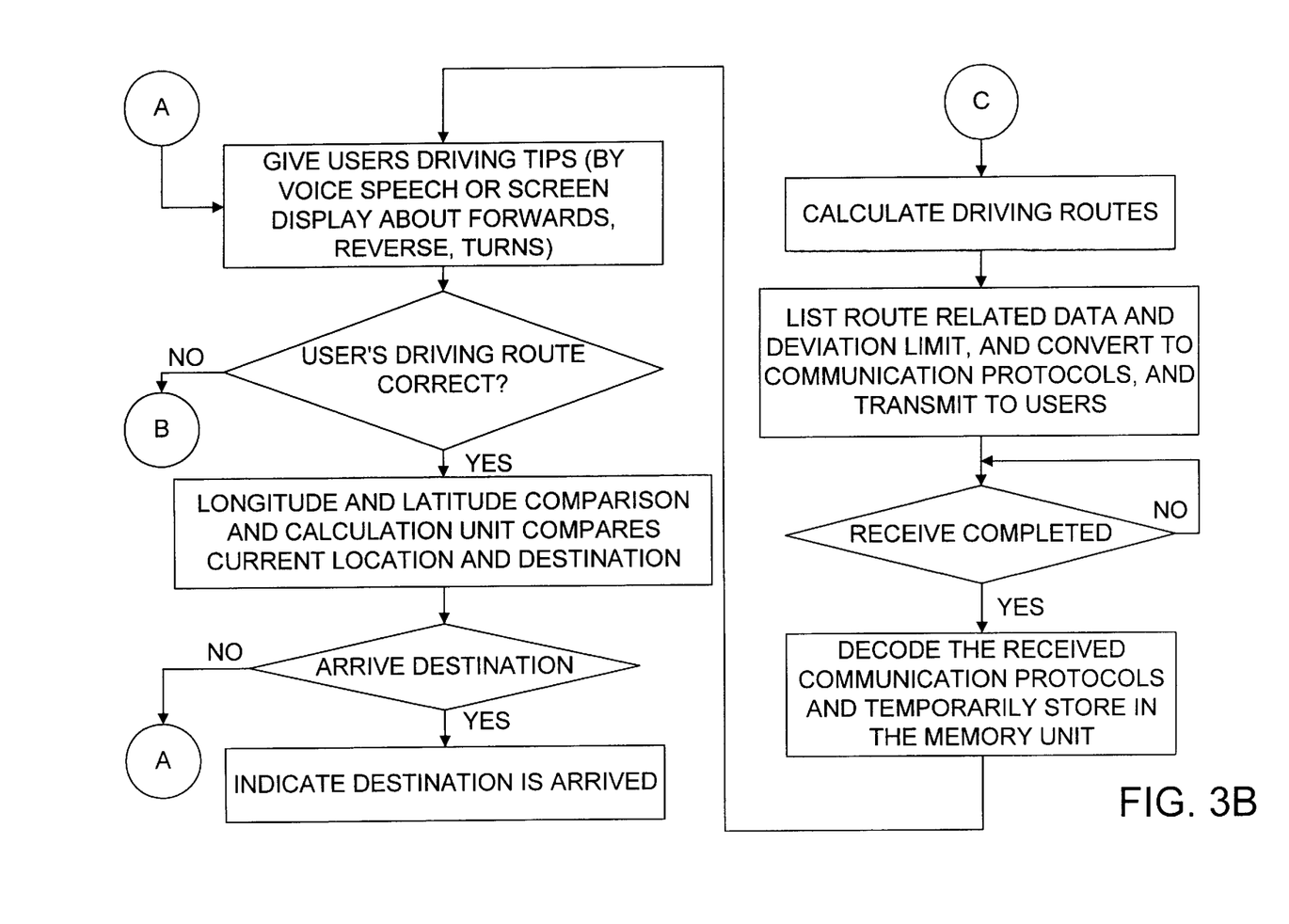
Figure 4:
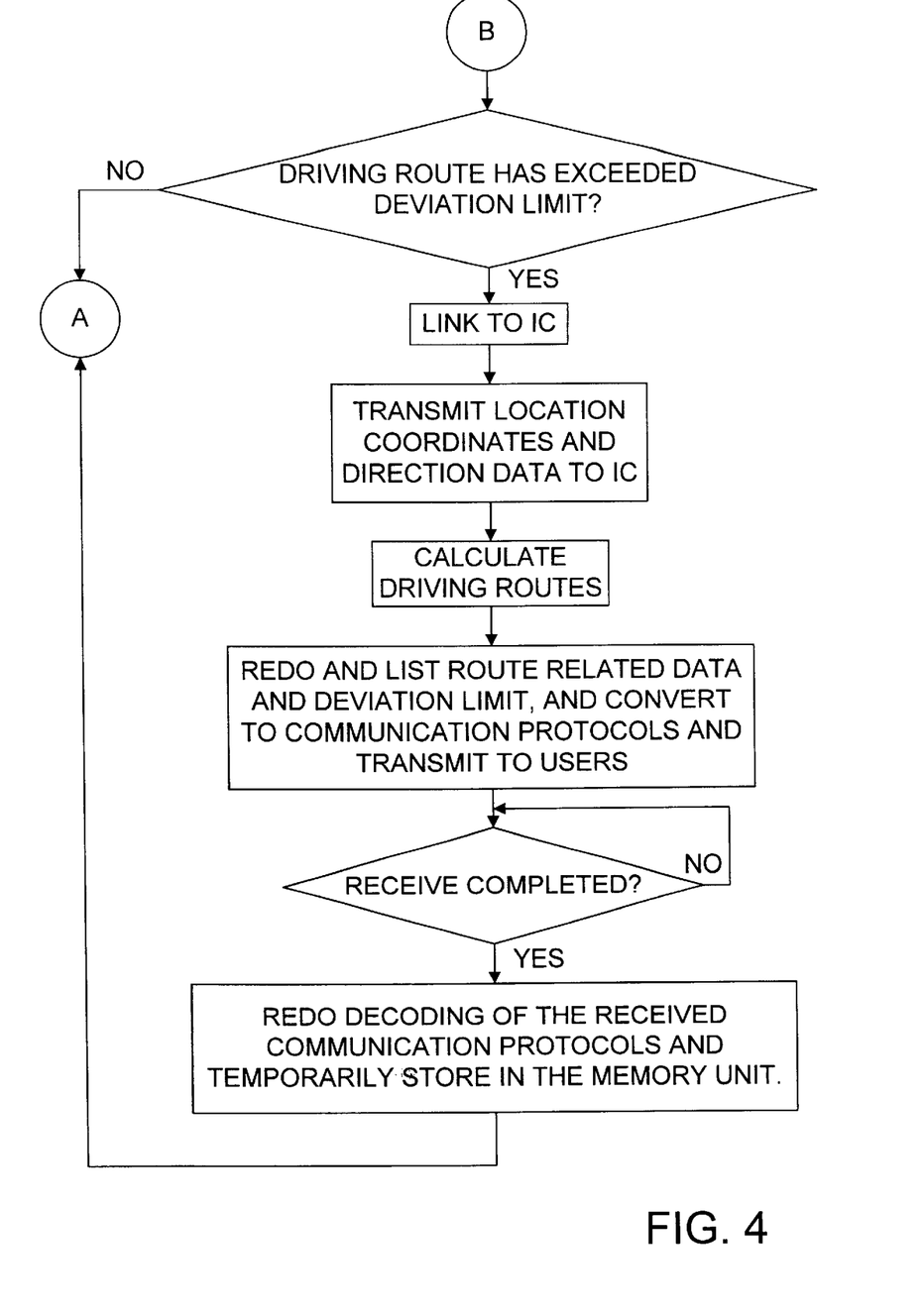
FIG. 4 is another process flow of the invention.

Referring to FIGS. 3A, 3B and 4, the operation process of the invention includes the following steps:

1. Users activates the system through the human machine interface 28 on the communication device 2.
2. Use the GPS device 1 to receive satellite signals, and through the position calculation unit 21 to convert the signals to usable data and temporarily store in the memory unit 23, and through the longitude and latitude comparison and calculation unit 24 to calculate and mark position.
3. The communication device 2 links to the information center A and transmits location data back to the information center A.
4. Users orally inform information center A people the desired destination (such as voice speech "Taipei city zoo", or "Kaoshiung Wufu one road No. 300", or "The nearest Mcdonald").
5. The electronic map of the information center A indicates user's location, direction and destination coordinates.
6. The processor in the information center A calculates suitable routes.
7. List driving routes (including turns, road conditions, distance information) and deviation limits, and convert to communication protocol signals and transmit back to the user.
8. The radio communication equipment 3 in user's communication device 2 receives information transmitted from the information center A, and determines if all information are received. If positive, cut off the linking to the information center A.
9. The received communication protocol signals are decoded by the communication protocols unit 22 and are temporarily stored in the memory unit 23.
10. The longitude and latitude comparison and calculation unit 24 in the communication device 2 compares the electronic maps downloading from the information center A and self location coordinates.
11. The resulting data from the longitude and latitude comparison and calculation unit 24 are fed to the speech synthesizer 25, and through the output unit 27 to indicate messages (may be voice speeches such as moving forwards, reverse, turn to the left (or right) after driving a certain distance, and may be coupled with display shown on the screen).
12. When the user driving ahead, the longitude and latitude comparison and calculation unit 24 in the communication device 2 constantly retrieves satellite signals and compares accuracy of the driving direction and determines if exceeding deviation limits. When the deviation does not exceed the deviation limits, the process goes back to step 11 to continue leading the user to the destination. On the contrary, if the deviation exceeds the deviation limits, the process goes to step 14.
13. Voice speech indicates that the destination is arrived.
14. The communication device 2 reestablishes linking with the information center A, and transmits location data back to the information center A.
15. The information center A marks anew user's location, direction and destination on the electronic map.
16. The processor in the information center A redoes calculations to get suitable routes.
17. Redo listing for driving routes (including turns, road conditions, distance information) and deviation limits, and convert to communication protocol signals and transmit back to the user.
18. The radio communication equipment 3 in user's communication device 2 receives the redone calculation data transmitting from the information center A, and determines if all information are received. If positive, cut off the linking to the information center A.
19. The received communication protocol signals are decoded by the communication protocols unit 22 and are temporarily stored in the memory unit 23.
20. The longitude and latitude comparison and calculation unit 24 in the communication device 2 compares the electronic maps downloading from the information center A and self location coordinates.
21. The resulting data from the longitude and latitude comparison and calculation unit 24 are fed to the speech synthesizer 25, and through the output unit 27 to indicate messages (may be voice speeches such as moving forwards, reverse, turn to the left (or right) after driving a certain distance, and may be coupled with display shown on the screen).
22. When the user driving ahead, the longitude and latitude comparison and calculation unit 24 in the communication device 2 constantly retrieves satellite signals and compares accuracy of the driving direction and determines if exceeding deviation limits. When the deviation does not exceed the deviation limits, the process goes back to step 21 to continue leading the user to the destination. On the contrary, if the deviation exceeds the deviation limits, the process goes to step 14.
23. Voice speech indicates that the destination is arrived.

By means of the system process flow set forth above, users need only to depress the pushbutton and orally inform the destination, navigation can be completely set. In addition, as the routes are provided by the information center, the information center can constantly revise routes to get different alternative routes based on changing conditions of roads (such as traffic congestion, road block, car accidents, etc.). User's driving routes might also incur deviations due to accidental factors or misjudgment. The invention provides the following approaches to determine such a situation and makes timely adjustments.

Figure 5:
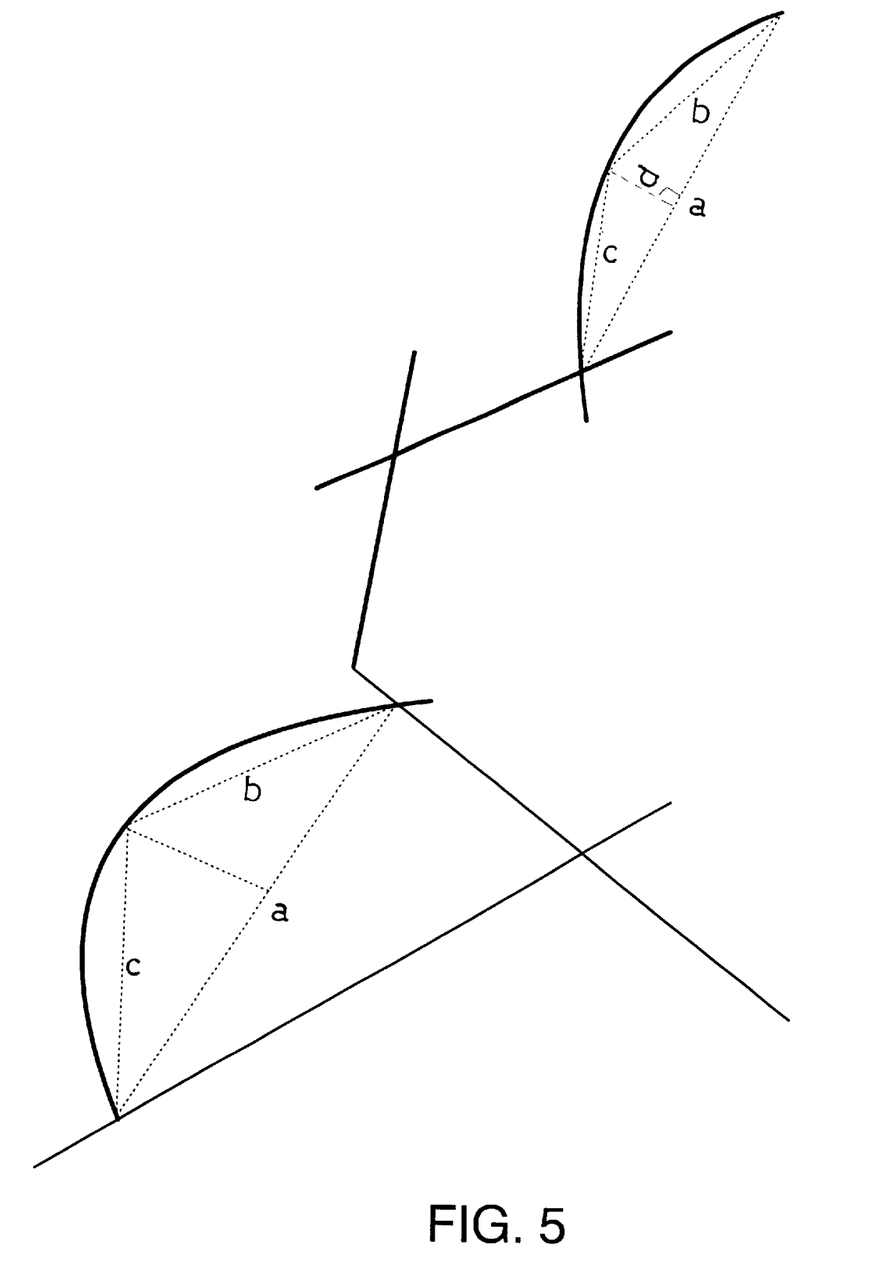
FIG. 5 is a schematic view of a route of the invention.

Referring to FIG. 5 for a road sketch, the route has two fixed points with a first straight line distance a linking therebetween. The planning route has an outmost point which has a second straight line distance d from the first straight line. d becomes the linear deviation limit L. In the event that the driving route has a deviation d which is greater than the linear deviation limit L, the route is deviated.

The second approach is using the straight distance a between two fixed points as basis to calculate a triangle abc proximate to the planning route, and to make the outcome of (b+c)/a the preset value L which is served as the linear deviation limit. When the actually calculated value L' is greater than L, the route is deviated. When the number of triangles being mapped and calculated increases, the sides bc of the triangles resemble more closely to the planning route, and deviation calculations are more accurate.

Whether using the first or second calculation approach, when the vehicle position is deviated from the set navigation route, the navigation required equipment automatically emits signals and transmits back to the navigation center. The navigation center based on current vehicle position redoes route setting processes. The transmission back signals may include route identification code to allow the navigation center to compare with original data. The transmission back signals may also include coordinates of the destination and current vehicle location for the navigation center to redo calculation for setting new route.

Figure 6:
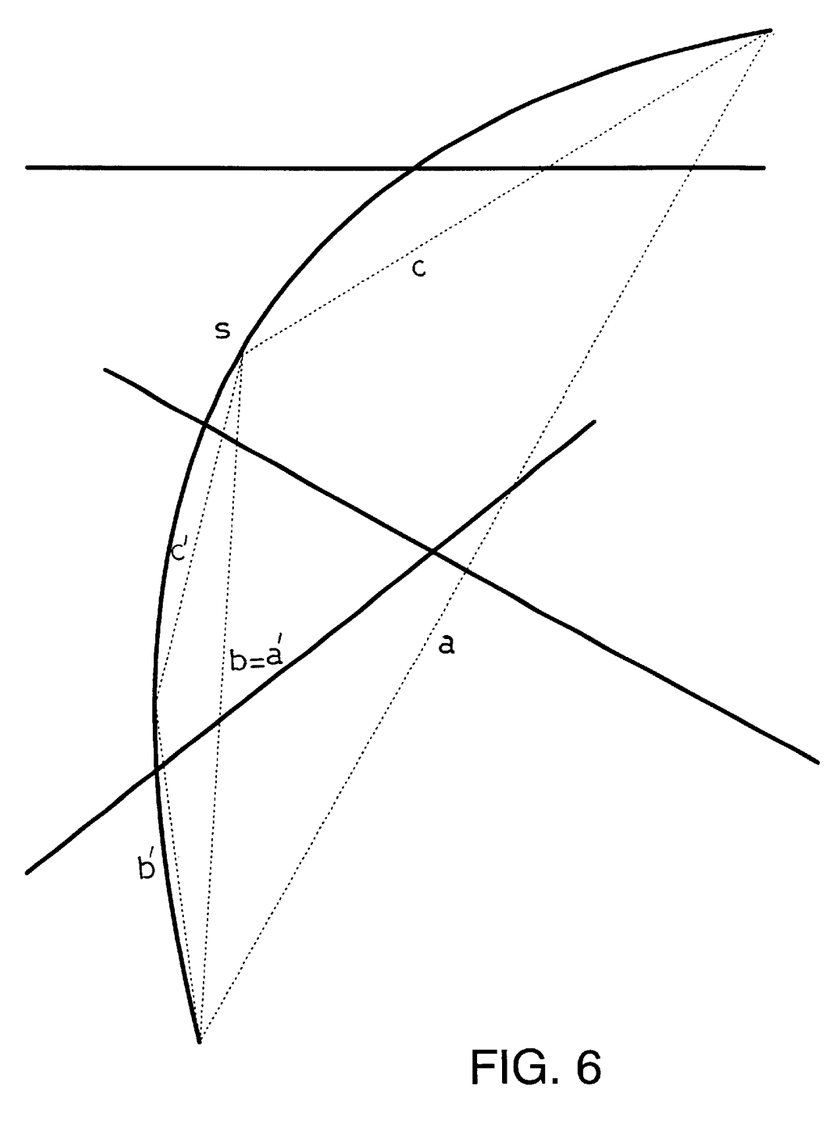
FIG. 6 is another schematic view of a route of the invention.

Referring to FIG. 6, when navigation deviation limit is too large, an additional fixed point S may be inserted on a selected spot on the route to divide the original single route in two route sections, then redo the new linear deviation limit.

By means of the embodiment set forth above, the invention can redo route deviation processing when driving route of the navigation required user has deviations, thus data transmission volume may be reduced, and service time for navigation center can be decreased and communication expenses for the navigation required user can also be reduced.

I claim:

1. A method for remote routes calculation and navigation with automatic route detection and revision comprising the steps of: requesting a navigation center to transmit route data obtained from route calculations to a car phone; providing coordinates and related data of every turning point on routes; and providing a linear deviation limit of two neighboring fixed points for route navigation use to the car phone as a basis for self monitoring of deviation from a navigated route, wherein the linear deviation limit is a maximum ratio value adding an allowance, the ratio value being derived from the sum of a first straight line distance between any point on a planning route and a front fixed point of the planning route and a second straight line distance between the any point and a rear fixed point of the planning route against a third straight line distance between the front fixed point and the rear fixed point.

2. The method of claim 1, wherein navigation required equipment automatically emits return signals to the navigation center when the location of a moving vehicle deviates from a calculated and set navigation route.

3. The method of claim 2, wherein the return signals include an identification code for the calculated and set navigation route to allow the navigation center to compare the return signals with original data.

4. The method of claim 3, wherein the identification code of the planning route is a code added by the navigation center after route calculation and before storing, the identification code being transmitted to the car phone along with the planning route data.

5. The method of claim 2, wherein the return signals include coordinates of destination and current vehicle location to allow the navigation center to calculate a new route.

6. A method for remote routes calculation and navigation with automatic route detection and revision comprising the steps of: requesting a navigation center to transmit route data obtained from route calculations to a car phone; providing coordinates and related data of every turning point on routes; and providing a linear deviation limit of two neighboring fixed points for route navigation use to the car phone as a basis for self monitoring of deviation from a navigated route, wherein a fixed point is inserted in a selected section of the route to divide an original single route to two route sections when the linear deviation limit exceeds a predetermined value, and new linear deviation limits are calculated.

* * * * *